United States Patent [19]
Glen et al.

[11] Patent Number: 5,928,395
[45] Date of Patent: Jul. 27, 1999

[54] BOLT CONNECTOR ASSEMBLY FOR BAG HOUSE

[75] Inventors: James R. Glen, Montgomery; Ted A. Folstad, Eden Prairie, both of Minn.

[73] Assignee: Donaldson Company, Inc., Minneapolis, Minn.

[21] Appl. No.: 09/144,768

[22] Filed: Sep. 1, 1998

Related U.S. Application Data

[63] Continuation of application No. 08/844,063, Apr. 18, 1997, Pat. No. 5,853,442.

[51] Int. Cl.$^6$ .................................................. B01D 46/02
[52] U.S. Cl. ........................... 55/378; 55/508; 411/366; 411/386
[58] Field of Search .................. 55/379, 378, 341.1, 55/508; 411/366, 386

[56] References Cited

U.S. PATENT DOCUMENTS

| Re. 18,299 | 10/1931 | Pierce | 411/366 |
|---|---|---|---|
| 2,666,334 | 1/1954 | Nalle | 411/366 |
| 2,862,622 | 12/1958 | Kircher, Jr. et al. | 55/379 |
| 3,951,627 | 4/1976 | Barr, Jr. et al. | 55/379 |
| 4,157,899 | 6/1979 | Wheaton | 55/273 |
| 4,232,497 | 11/1980 | Merschnig | 411/366 |
| 4,290,337 | 9/1981 | Kuwata et al. | 411/366 |
| 4,443,237 | 4/1984 | Ulvestad | 55/379 |
| 4,504,288 | 3/1985 | Kreft | 55/379 |
| 4,600,343 | 7/1986 | Frerejacques | 411/386 |
| 4,738,696 | 4/1988 | Staffield | 55/379 |
| 4,850,771 | 7/1989 | Hurd | 411/367 |
| 5,173,098 | 12/1992 | Pipkorn | 55/379 |
| 5,306,091 | 4/1994 | Zaydel et al. | 411/386 |
| 5,413,442 | 5/1995 | Grey | 411/386 |

FOREIGN PATENT DOCUMENTS

| 2201111 | 4/1974 | France . |
|---|---|---|
| 2411697 | 1/1975 | Germany . |
| 2806793 | 8/1979 | Germany . |

OTHER PUBLICATIONS

Torit Installation and Operation Manual, Donaldson Company, Inc., pp. 1–21 (1994).

*Primary Examiner*—Duane S. Smith
*Attorney, Agent, or Firm*—Merchnt, Gould, Smith, Edell, Welter & Schmidt, P.A.

[57] ABSTRACT

A connector assembly is provided. The connector assembly is particularly well adapted for connection of a tube top flange to a tube sheet, in a bag house or filter assembly. The connector assembly includes a bolt having a retainer construction or skirt thereon, to retain the bolt in place. The bolt has shank sections of different cross-sectional size, to advantage.

19 Claims, 4 Drawing Sheets

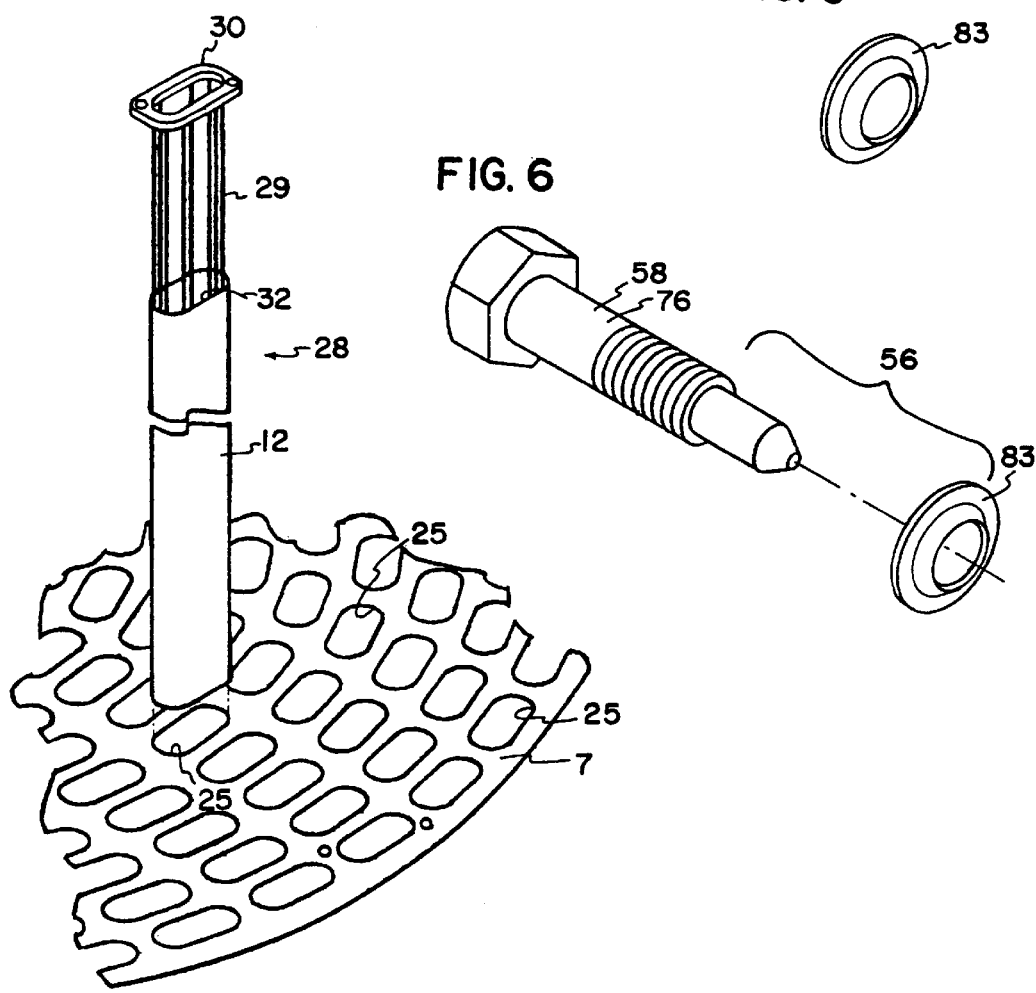
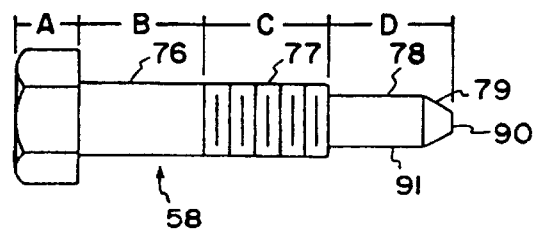
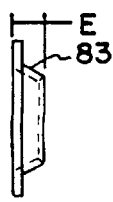

BOLT CONNECTOR ASSEMBLY FOR BAG HOUSE

This application is a Continuation of application Ser. No. 08/844,063, filed Apr. 18, 1997, which application is incorporated herein by reference, now U.S. Pat. No. 5,853,442.

FIELD OF THE INVENTION

The present invention relates to bag house dust collectors. It particularly concerns a connector design for use in attachment of a filter collar or tube frame flange to a tube sheet, in bag houses. The disclosure also concerns methods of assembly and use.

BACKGROUND OF THE INVENTION

Bag house dust collectors are generally used to filter particulate material from industrial offgases, before the gases are vented or cycled. The arrangements generally include flexible filter bags supported within the construction. The filter bags are generally secured to a tube sheet, by a tube flange. The tube sheet separates the clean air side from the dirty air side of the filter system or collector. In the past, a conventional, threaded shank, steel bolt and riv-nut design has been used for the connection.

Large industrial bag house dust collectors may include hundreds of filter tubes therein. For each filter tube, there are generally at least two bolts used to provide the connection between the tube flange and the tube sheet. In the environment of a bag house, there have been problems with conventional bolt designs. These relate primarily to: loss of loose parts; plugging of threads due to dust in the environment of use; and, ease of assembly.

SUMMARY OF THE INVENTION

According to the present invention, a connector assembly is provided. The connector assembly generally comprises a bolt and a retainer assembly or construction. A bolt component is provided, which has a head. In preferred embodiments, the bolt includes, projecting from the head in the order listed: a first shank section; a threaded section; and, a second shank section. The first shank section preferably has a non-threaded outer surface and has a first outer dimension. In this context, the term "outer dimension" refers to the largest cross-sectional dimension of the piece referenced. In this instance, it would be the largest cross-sectional dimension of the first shank section. Typically, the first shank section will have a circular cross-section and the first outer dimension will be the diameter of this section.

The threaded section is oriented adjacent the first shank section. The threaded section preferably has an outer diameter which is no greater than the first outer dimension, i.e., no greater than the largest cross-sectional dimension of the first shank section.

The second shank section is oriented adjacent the first threaded section. The second shank section preferably has an outer dimension no greater than about 90% of the outer diameter of the threaded section. Preferably the outer dimension of the second shank section is about 60–80% of the outer diameter of the threaded section. Alternately stated, the largest cross-sectional dimension of the second shank section is preferably no greater than about 90% (more preferably 60%–80%) of the outer diameter of the threaded section. Typically the second shank section will also have a circular dimension and its "outer dimension" will be its cross-sectional diameter.

The connector assembly also includes a retainer construction secured on the bolt, typically to the first shank section. The retainer construction preferably has an outer dimension which is at least 30% (preferably 50–70%) greater than the outer dimension of the first shank section. Typically the retainer construction will have a circular outer perimeter and its outer dimension will be its outside diameter. The retainer construction will operate as a skirt positioned on the first shank section and separated from the bolt head. This will prevent the bolt from separating from a tube top flange or similar construction, through which it extends in use.

Preferably the first shank section and the second shank section have smooth outer surfaces. This provides advantage in use, as described below.

Particularly when used in connection with filter assemblies as described herein, preferably: the first shank section has an outer dimension within the range of 0.3–0.32 inches (i.e., 0.76–0.82 cm), preferably 0.303–0.312 inches (i.e., 0.77–0.79 cm); the threaded section has an outer diameter within the range of 0.3–0.32 inches (i.e., 0.76–0.82 cm), preferably 0.3035–0.3125 inches (0.771–0.794 cm); and, the second shank section has an outer dimension within the range of 0.19 to 0.25 inches (0.48–0.64 cm). Also in certain circumstances, preferably: the first shank section has a length of 0.45–0.55 inches (i.e., 1.14 cm–1.4 cm), preferably 0.47–0.53 inches (i.e., 1.19–1.35 cm); the threaded section has a length of 0.45–0.55 inches (i.e., 1.14 cm–1.4 cm), preferably 0.47–0.53 inches (i.e., 1.19–1.35 cm); and, the second shank section has a length of 0.45–0.55 inches (i.e., 1.14–1.4 cm), preferably 0.47–0.53 inches (i.e., 1.19 cm–1.35 cm).

In preferred assemblies, the second shank section has a tapered tip, to facilitate engagement with a riv-nut during use.

The connector assembly may be characterized as including an internally threaded riv-nut, for connection to the bolt. The internally threaded riv-nut includes an internally threaded section sized to receive the bolt threaded section. Preferably, in use, the bolt and the riv-nut are oriented such that when the bolt is completely tightened, the threaded section of the bolt extends to a distal end of the internally threaded riv-nut, with the second shank section projecting out of the riv-nut on an opposite side (i.e., the distal side) from a side (i.e., the proximal side) out of which the first shank section projects. Most preferably, to accommodate this, the threaded section of the riv-nut extends to a point from the bolt head, during assembly, the same as the far end of the bolt threaded section from the bold head. This means that the bolt threads terminate at the end of the riv-nut threads, on the end of the riv-nut which projects into the dirty side of the tube sheet (i.e., away from the flange).

According to the present invention, an overall assembly is provided which includes a connector assembly as described above in combination with a tube top flange of a filter house. Further, the assembly may include a tube sheet, with a top flange secured to the tube sheet by the connector assembly.

According to the present invention, methods of assembling a connector arrangement as described are provided, as well as methods of use.

BRIEF DESCRIPTION OF THE DRAWINGS

in FIG. 1, portions being shown broken away to show internal detail;

FIG. 2 is an exploded, fragmentary schematic view of a filter tube, filter tube frame, tube flange and tube sheet used in the bag house of FIG. 1 according to the present invention;

in FIG. 5, the arrangement being depicted with a bolt and retainer arrangement according to the present invention;

FIG. 6 is an exploded perspective view of a bolt and retainer arrangement usable in the arrangement of FIGS. 1–5;

FIG. 7 is a side elevational view of a bolt component of the arrangement shown in FIGS. 5 and 6;

FIG. 8 is a side elevational view of a retainer construction depicted in FIGS. 5 and 6; and, FIG. 9 is a perspective view of the retainer construction depicted in FIGS. 6 and 8.

DETAILED DESCRIPTION OF THE PREFERRED EMBODIMENT

Figure 1:
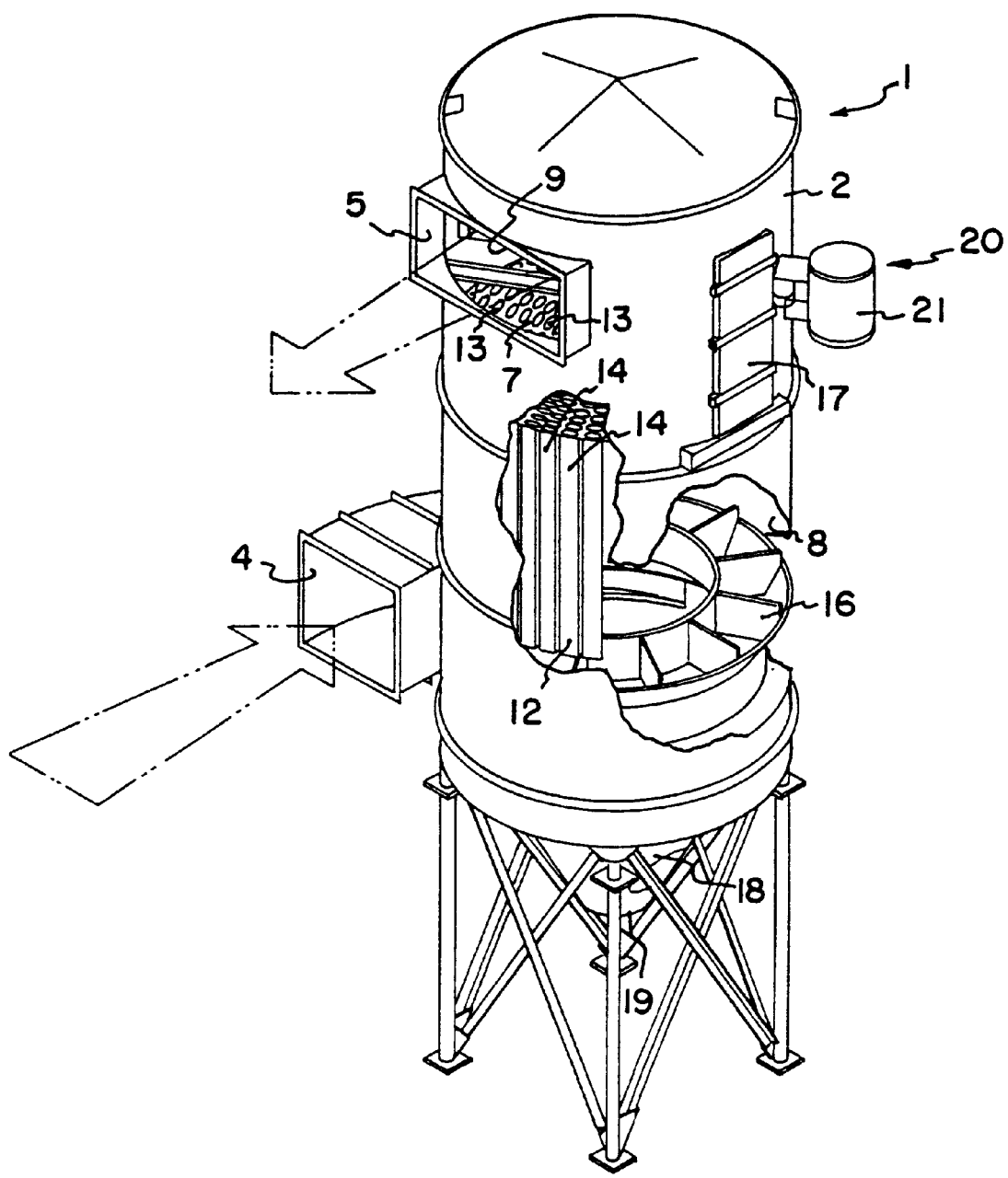
FIG. 1 is a schematic perspective view of a bag house dust collector.

The reference numeral 1, FIG. 1, generally designates a dust collector or bag house incorporating a connector assembly according to the present invention. Except as described herein with respect to the connector assembly or arrangement, the dust collector 1 may be a conventional dust collector. Indeed, the details shown in the drawing depicted are of a Donaldson Model RFW RF dust collector operational schematic, appearing in a Donaldson Company, Inc. 1994 publication. A reason that the drawing of FIG. 1 is not labeled as prior art, is because according to the present description, it would include a connector arrangement according to the present invention therein. It is noted, however, that in FIG. 1 details of the connector arrangement or assembly are not viewable.

Still referring to FIG. 1, the dust collector 1, which is depicted with portions broken away, includes an outer housing 2 having a dirty air inlet 4 and a clean air outlet 5. Tube sheet 7 separates housing 2 into a dirty air side or section 8 and a clean air side, section or plenum 9. Within the dirty air section 8 are provided a plurality of filter tubes or bags 12. Each filter tube 12 has a clean air exit port or open end 13 associated with or adjacent to tube sheet 7, and oriented, during assembly, such that clean air exit from the open end 13 is into the clean air section 9.

In operation, dirty air passes into the housing 2 through the dirty air inlet 4. The air is then directed through the filter tubes or bags 12. As the air enters the bags 12, particulate material carried in the air is trapped on the outer walls 14 of the bags 12. Clean air inside of the bags 12 then passes upwardly and exits through the open ends 13 (from the bags 12), through the tube sheet 7 and into the clean air section 9. The clean air is then exhausted or vented from the dust collector 1 through clean air outlet 5.

For the arrangement shown, the dust collector 1 includes an inlet baffle construction 16, a filter tube access door 17, a dust collector hopper 18, and a dust outlet 19, in a conventional manner.

In addition, the arrangement shown includes a compressed air apparatus or arrangement 20, for periodic cleaning of the filter tubes or bags 12. In general, this arrangement 20 provides for selected periodic pulses of pressurized gas in a direction of backflow through the filter tubes or bags 12. This will push collected dust off of the bag outer walls 14, causing the dust to fall into the hopper 18, from which it can be removed via the dust outlet 19. A pressurized air reservoir for use in conducting this cleaning operation is depicted at 21. Compressed air cleaning arrangements of the type depicted and described are also conventional for dust collectors.

In a large industrial dust collector of the type shown in FIG. 1, the tube sheet 7 will typically include from 48 to 484 holes therein, for attachment of individual filter bags 12. The arrangement, then, will typically include 48 to 484 filter bags 12.

At initial startup and assembly, it is necessary to install the filter bags 12. This is generally done by a worker who enters through access door 17 and stands on or over the tube sheet 7, during installation. Also, periodically, filter tubes 12 need to be serviced or replaced, again requiring a worker to enter through access door 17 and to stand on or over the tube sheet 7. It is presently estimated that through the lifetime of an apparatus such as dust collector 1, each of the filter bags 12 will be replaced at least 20 to 40 times.

The present disclosure concerns a preferred connector arrangement, to facilitate the attachment of the filter tubes 12 to the tube sheet 7 in a relatively convenient and relatively efficient manner. The connector arrangement is depicted in FIGS. 5–9.

Attention is first directed to FIG. 2, however. FIG. 2 is a fragmentary schematic view depicting a step of installing a filter tube in a dust collector of the type depicted in FIG. 1. Referring to FIG. 2, the tube sheet 7 is shown in fragmentary schematic view. At 25, the various holes in the tube sheet 7, providing communication between the dirty air section and the clean air section (8, 9, respectively, in FIG. 1) are shown.

Referring to FIG. 2, a filter tube assembly 28 is depicted. The filter tube assembly 28 includes: filter bag 12; filter tube frame 29; and, tube frame flange (or top flange) 30. In operation, the filter tube or bag 12, which is of a flexible fabric construction, is slid over the filter tube frame 29 until top end 32 of bag 12 is brought into operative association with flange 30. Preferred connection between the flange 30 and the tube 12 is described hereinbelow with respect to FIG. 5. The filter tube frame 29 is positioned inside the bag 12 during use, and provides internal support for the bag 12 against collapse. During assembly, the arrangement 28 is slid downwardly through one of the apertures 25 until flange 30 engages tube sheet 7. The flange 30 is then secured to the tube sheet 7, by a connector arrangement as described below.

Figure 3:
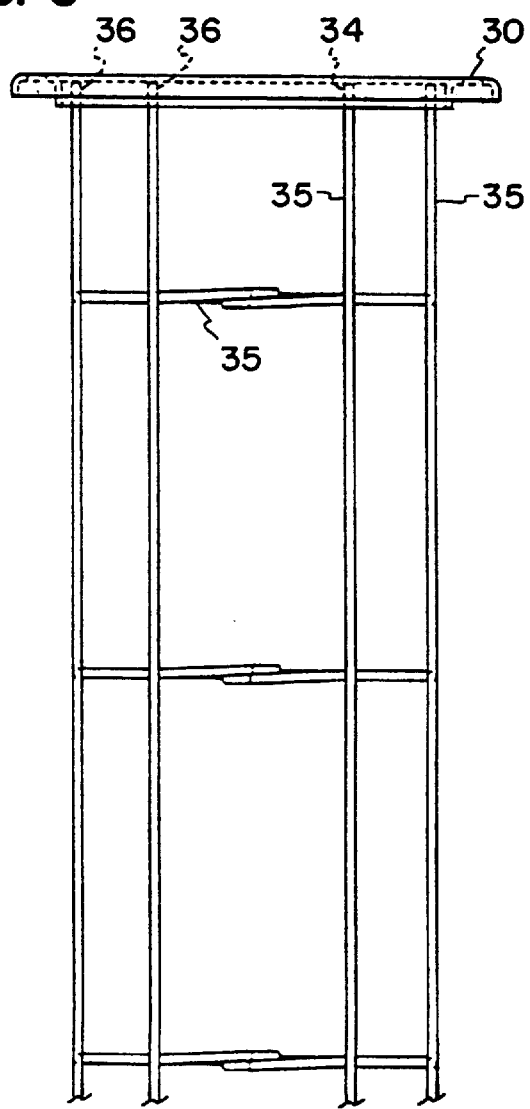
FIG. 3 is a side elevational view of the tube flange and tube frame shown in FIG. 2.

Attention is now directed to FIG. 3, which depicts a side elevational view of the filter tube frame 29 and tube frame flange 30. The frame 29 comprises a plurality of interconnected rods 35, typically comprising 20 to 32 metal rods. The framework represented by the rods 35 is connected to the top flange 30, for example by welding, as indicated at 36.

Figure 4:
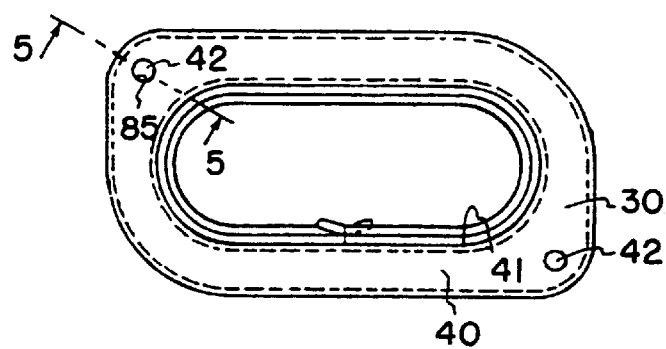
FIG. 4 is a top plan view of the arrangement shown in FIG. 3.

In FIG. 4, a top plan view of the top flange 30 is depicted. The top flange 30 includes an outer plate or rim 40 defining an internal oval aperture 41. In FIG. 4, bolt holes 42 are depicted, by which flange 30 can be secured to plate 7, FIGS. 1 and 2.

Figure 5:
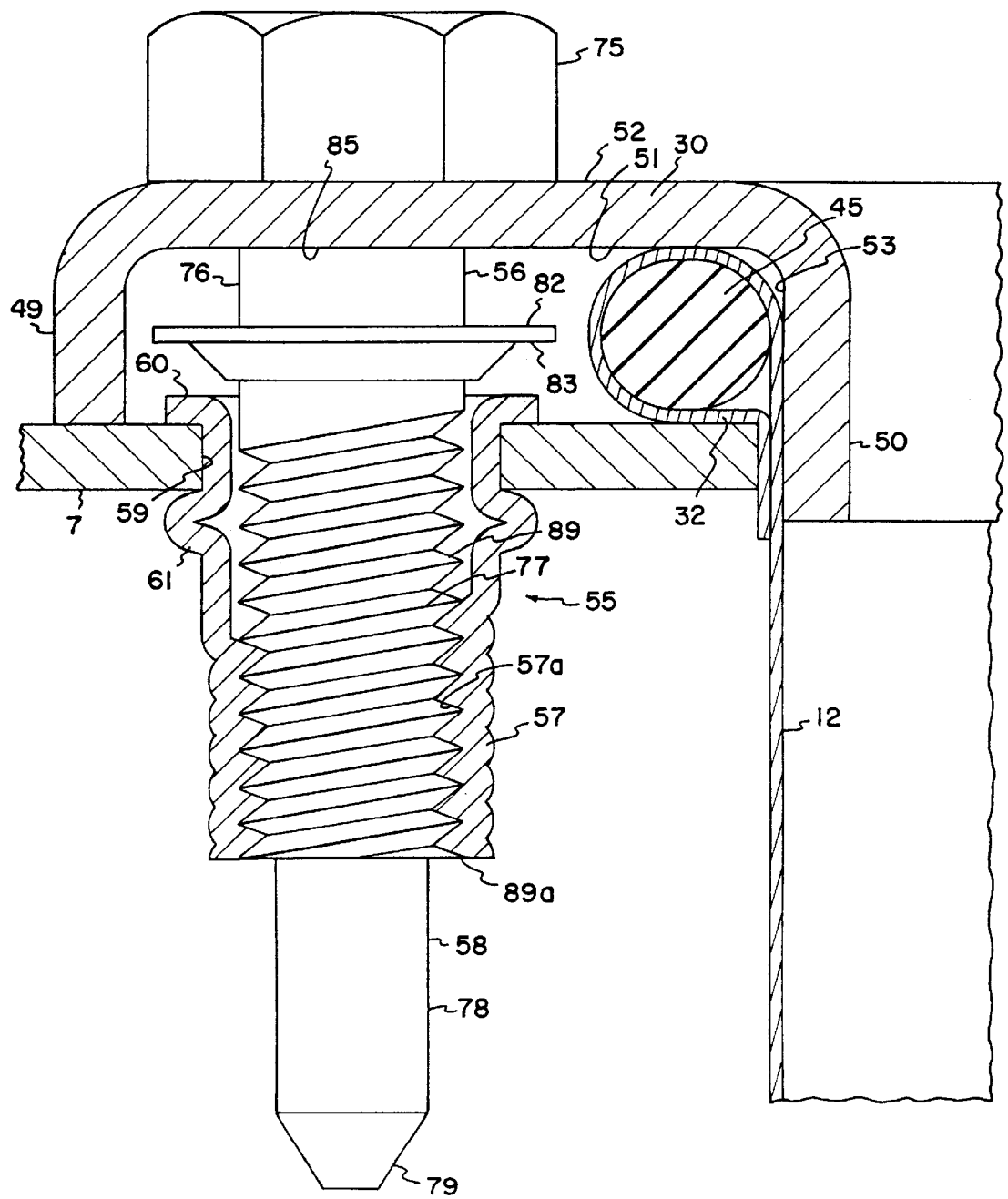
FIG. 5 is an enlarged, fragmentary, cross-sectional view taken generally along line 5—5, FIG. 4.

Attention is now directed to FIG. 5, which is a cross-sectional view taken along line 5—5, FIG. 4. Note that in FIG. 5, a bolt and retainer construction is depicted operably retaining the flange 30 to the tube sheet 7.

Referring to FIG. 5, filter bag 12 is shown with top edge 32 including a section sewn around a tube ring 45. Tube ring 45 is a conventional soft polymeric o-ring.

Top flange 30 includes outer circumferential depending rim 49 and inner circumferential depending rim 50. Tube ring 45 is sized and configured to fit within recess 51 defined under plate 52 and between the outer and inner rims 49 and 50. It is also sized to snugly secure filter bag 12 against an outer surface 53 of inner rim 50. This will secure bag 12 in position. (Note that framework 29 is not shown in FIG. 5.)

Thus far, the assembly and arrangement depicted is conventional. The invention presented herein concerns a preferred manner of connecting the tube frame flange 30 to the tube sheet 7.

Referring to FIG. 5, a secure connection between the tube frame flange 30 and the tube sheet 7 is provided by connector assembly 55. The connector assembly 55 comprises bolt construction 56 including riv-nut 57 and bolt 58. The riv-nut 57 may comprise a conventional, internally threaded, riv-nut secured to bolt hole 59 in tube sheet 7 in a conventional manner, i.e., due to compression of flanges 60 and 61. As a result of compression of the tube sheet 7 between flanges 60 and 61, riv-nut 57 is securely and non-rotatably positioned on the tube sheet 7. Thus, when bolt 58 is removed, riv-nut 57 remains secured in position, i.e. riv-nut 57 is not a loose item. Alternate approaches could comprise welding of nuts similar to the riv-nuts in place and similar secure attachments.

With respect to the connector assembly 55, bolt 58 includes features which are unique for connector assemblies used in dust collectors or bag houses, and which provide significant advantage. Still referring to FIG. 5, bolt construction 56 includes bolt 58 having the following features: head 75, first shank extension 76, threaded extension 77, and second shank extension 78 including tip 79. Preferably, for reasons indicated below, first shank extension 76, second shank extension 78 and tip 79 are not threaded, but rather have smooth surface areas. The threaded extension 77 is preferably sized and positioned for engagement with riv-nut 57, during use.

Bolt construction 56 further includes spacer or retainer construction 82 thereon. In the embodiment shown, retainer construction 82 is ring 83 and is preferably spaced from bolt head 75 a sufficient distance to provide for a gap of about 0.27–0.31 inches (i.e., 0.68–0.79 cm), typically 0.273–0.303 inches (i.e., 0.69–0.77 cm) between the ring 83 and the flange 30, when the bolt head 75 is positioned against the flange 30. Preferably retainer ring 83 has an outer dimension (diameter if round) about 0.17–0.21 inches (0.43–0.54 cm), typically about 0.173–0.203 inches (i.e., 0.429–0.516 cm), larger than an outer dimension (diameter if round) of the first shank extension 76, and at least 0.14–0.18 inches (i.e., 0.35–0.46 cm), typically 0.142–0.172 inches (i.e., 0.36–0.44 cm), larger than a largest dimension of aperture 85 in flange 30, through which bolt 58 extends in use.

Herein, when the term "outer dimension" is used in connection with various parts and components. The term is meant to refer to a largest cross-sectional dimension for the component referenced. In typical preferred embodiments, the shanks and apertures referenced herein will have circular cross-sections, and thus the "outer dimension" will be a diameter. It is foreseen that in some applications, some components may be modified from circular cross-sections, in which case the reference is to the largest (linear) cross-sectional dimension. The purpose of this will be apparent from the drawings, especially FIG. 5, which indicates how the parts are connected during use.

Attention is now directed to FIGS. 5, 6, 7, 8 and 9, in which portions of the assembly comprising the bolt construction 56, i.e., the bolt 58 and retainer ring 83, are depicted.

Referring to FIGS. 8 and 9, preferably the retainer ring 83 comprises a stamped piece of stainless steel, of appropriate size to tightly engage a portion of first shank extension 76 when slid thereover. This can be accommodated by stamping ring 83 with a somewhat bell or skirt shape, when viewed from the side, as shown in FIG. 8. It would then be mounted with the wider part of the bell or skirt directed toward the bolt head, as it is slid over the threaded shank. When this occurs, a tight connection, and resistance to separation of the retainer ring from the shank, can readily be accomplished. As a result, when bolt 58 is mounted through aperture 85, in flange 30, and retainer ring 83 is pressed over tip 79 and onto shaft extension 76, the bolt 58 is secured against separation from the top flange 30. That is, once retainer ring 83 is secured and positioned tightly, by friction fit or, if desired, braising or spot welding, bolt 58 can no longer become readily disattached from top flange 30, even when completely loosened from riv-nut 57. Alternately stated, bolt construction 56 is secured in aperture 85 by extension of first shank extension 76 through the aperture 85, bounded on opposite sides by head 75 and retainer ring 83.

It is noted that in FIG. 5, the threaded section 57*a* of the riv-nut 57 is completely filled by the threaded section 77 of the bolt 58. Indeed, a portion of the threaded section 77 of the bolt 58 projects outwardly toward the bolt head 75 from the threaded section of the riv-nut 57. This is preferred.

Referring to FIGS. 6 and 7, it is noted that the outer dimensions of shank extension 76 and threaded extension 77 are about the same, and both are larger than second shank extension 78. Preferably the largest cross-sectional dimension of second shank extension 78 is no more than 90%, and preferably is about 60–80% of the diameter of the thread extension 77. Thus, second shank extension 78 does not engage internal threads in riv-nut 57, as bolt 58 is projected or pushed therethrough. Preferably the length of second shank extension 78 is sufficient to project at least 0.45–0.55 inches (i.e., 1.14–1.4 cm), typically 0.47–0.53 inches (i.e., 1.19–1.35 cm) beyond riv-nut 57 in use (i.e., when the bolt 58 is fully tightened). Also as indicated in FIG. 7, preferably tip 79 is tapered, or frustoconical in extension between region 78 and end 90.

A bolt and retainer ring construction such as that shown in FIGS. 6–8 is advantageous for numerous reasons. For example:

1. With conventional bolt arrangements, the bolt is separable from the top flange 30 in use. This can be cumbersome and difficult for the worker, during changeout procedures. The use of the retainer ring 83 ensures that even when the bolt construction 56 is fully loosened, it will not readily separate from the top flange 30.

2. The tapered portion or end 85 of tip 79 provides a self-indexing function, facilitating alignment between the bolt 58 and the riv-nut 57 in use. This is helpful because when the arrangement is assembled, the worker cannot clearly see the riv-nut 57 underneath top flange 30. The tapered tip 79 will help orient the bolt 58 appropriately, and reduce likelihood of cross-threading or stripping.

3. With conventional bolt connectors, plugging of the threads with dust can be a problem. In particular, any exposed threads of the bolt end which extend beyond the end of the riv-nut may fill with dust. During bolt removal, the dust may be deposited on the riv-nut threads. This can cause the riv-nut to strip or the bolt to shear. The narrow diameter for second shank extension 78 helps avoid this. Even if dust collects on section 78, it will not be deposited on the threads of the riv-nut 57 during withdrawal of the bolt 58, during a changeout operation. Thus, when the bolt construction 56 is reinserted into the riv-nut 57, the internal threads of the riv-nut 57 will remain relatively clean, reducing likelihood of shearing. This is facilitated by ensuring that the length of the threaded extension 77 is such that the threads 89 of the threaded extension 77 do not extend beyond end 89*a* of riv-nut 57, FIG. 5, when the connector assembly is in place. Preferably, threads 89 terminate at the end 89*a* of riv-nut 57.

4. Also, the position of retainer 82 on bolt shaft 76 allows the bolt threads 77 to be loosened completely from riv-nut threads before retainer 82 contacts the underside of flange 30. Therefore, multiple bolts can be easily loosened, with less risk of damage to the assembly.

A PARTICULAR PREFERRED BOLT ASSEMBLY

A particular preferred bolt assembly as depicted in FIGS. 6, 7, 8 and 9, would be as follows. It is noted that in the figures some relative dimensions may be shown exaggerated with respect to the preferred dimensions stated below.

The bolt 58, FIG. 7, would comprise grade 5 zinc plated steel or #304 stainless steel. Its total length would be about 1.75 inches (4.45 cm), with: the head (A) having a thickness of about 0.25 inches (0.63 cm); the first shaft extension (B) having a length of about 0.5 inches (1.27 cm); the threaded extension (C) having a length of about 0.5 inches (1.27 cm); and the second extension (D) having a total length of about 0.5 inches (1.27 cm), including both the straight portion and the tapered tip. The straight portion of the second extension would have a length of 0.38 inch (0.96 cm) and the tip a length of 0.12 inch (0.30 cm).

Still referring to FIG. 7, the head of the bolt would be a ½ inch (1.27 cm) hex head. The diameter of the first shank extension, after plating, would be about 0.312 inches (0.79 cm). The diameter of the threaded section would be about the same, with the threads being ⁵⁄₁₆-18 UNC-2A threads (Universal National Coarse) or comparable metric threads if desired. The diameter of the smooth, nontapered part of the second shank extension would be about 0.22 inches (0.56 cm). The diameter of the very tip 90 would be about 0.07 inches (0.178 cm), with the taper extending in an angle of about 30° inwardly, from the outer surface 91.

Referring to FIG. 9, the retainer ring 83 would be about 0.02 inches (0.05 cm) thick. The outside diameter of the retainer ring 83 would be about 0.5 inches (1.27 cm).

The total height of the ring, dimension E, FIG. 8, would be about 0.06 inches (0.15 cm). The inside diameter of the aperture in the ring would be about 0.3 inches (0.76 cm).

The specific dimensions referenced in this section for a particular preferred bolt assembly, shown in FIGS. 7–9, provide for preferred operation. However, equally preferred operation can be obtained with appropriate variation in the dimensions. The specific dimensions also serve to provide an assembly which is of attractive appearance.

We claim:

1. An assembly comprising:
   (a) a top flange having a plate including at least one bolt hole therein;
   (b) a connector assembly comprising a bolt and a retainer ring;
      (i) said bolt having: a head; a first shank section; a threaded section; and, a second shank section;
         (A) said first shank section being adjacent said head and having a non-threaded outer surface;
         (B) said threaded section being adjacent said first shank section; said threaded section having an outer diameter;
         (C) a second shank section having a non-threaded outer surface with an outer dimension smaller than said threaded section outer diameter;
         (D) said bolt projecting through said at least one bolt hole in said top flange;
      (ii) said retainer ring being secured to said bolt on an opposite side of said top flange from said bolt head;
         (A) said ring being spaced from said bolt head and said top flange; and,
   (c) a tube sheet having at least one internally threaded nut therein;
      (i) said top flange being secured to said tube sheet by threaded engagement between said bolt and said nut.

2. An assembly according to claim 1 wherein:
   (a) said internally threaded nut includes an internally threaded section that extends to a distance away from said bolt head, during assembly, no greater than a distance that said bolt threaded section extends.

3. An assembly according to claim 1 wherein:
   (a) said second shank section has a tapered tip.

4. An assembly according to claim 3 wherein:
   (a) said first shank section has a circular cross-section; and
   (b) said second shank section has a circular cross-section.

5. An assembly according to claim 4 wherein:
   (a) said retainer ring has an outer dimension at least 30% greater than a largest dimension of the bolt hole through which the bolt projects.

6. An assembly according to claim 5 wherein:
   (a) said first shank section has a length of 0.45–0.55 inches.

7. An assembly according to claim 6 wherein:
   (a) the threaded section is no shorter than the first shank section.

8. An assembly according to claim 7 wherein:
   (a) the threaded section has an outer dimension no greater than an outer dimension of the first shank section.

9. An assembly according to claim 8 wherein:
   (a) said second shank section has an outer dimension no greater than 90% of the outer dimension of the threaded section.

10. An assembly according to claim 9 wherein:
    (a) said second shank section has a greatest outer dimension of within the range of 60–80% of an outer dimension of said threaded section.

11. An assembly according to claim 10 wherein:
    (a) said tapered tip of said second shank section has a length of extension of 0.12 inch.

12. An assembly according to claim 11 wherein:
    (a) said bolt head is a hex head.

13. An assembly according to claim 12 wherein:
    (a) said bolt head is a ½ inch hex head.

14. An assembly according to claim 13 wherein:
    (a) said threaded section comprises ⁵⁄₁₆-18 UNC-2A threads.

15. An assembly according to claim 12 wherein:
    (a) said second shank section has a non-threaded, non-tapered portion with an outer dimension of 0.16–0.25 inch.

16. An assembly according to claim 15 wherein:
    (a) the retainer ring has an outside diameter of at least 0.5 inch.

17. An assembly according to claim 12 wherein:
    (a) said bolt is selected from: grade 5 zinc plated steel and #304 stainless steel.

18. An assembly according to claim 17 wherein:
    (a) said bolt has an overall length of 1.75 inch.

19. An assembly according to claim 18 wherein:
    (a) said bolt head has a thickness of 0.25 inch.

* * * * *